Feb. 20, 1945.    S. B. SMITH    2,369,925
SURGICAL INSTRUMENT FOR BONE CUTTING
Filed Feb. 24, 1944
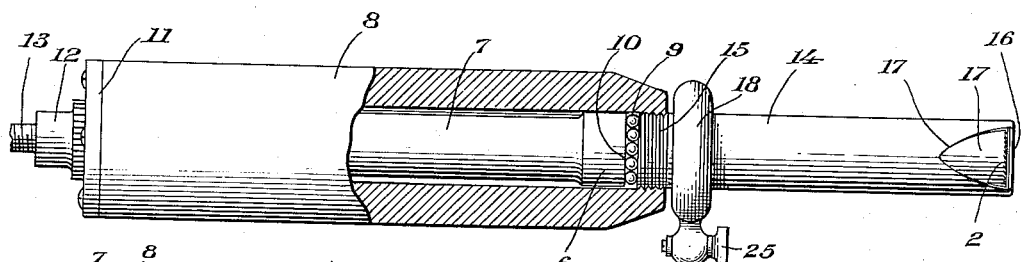
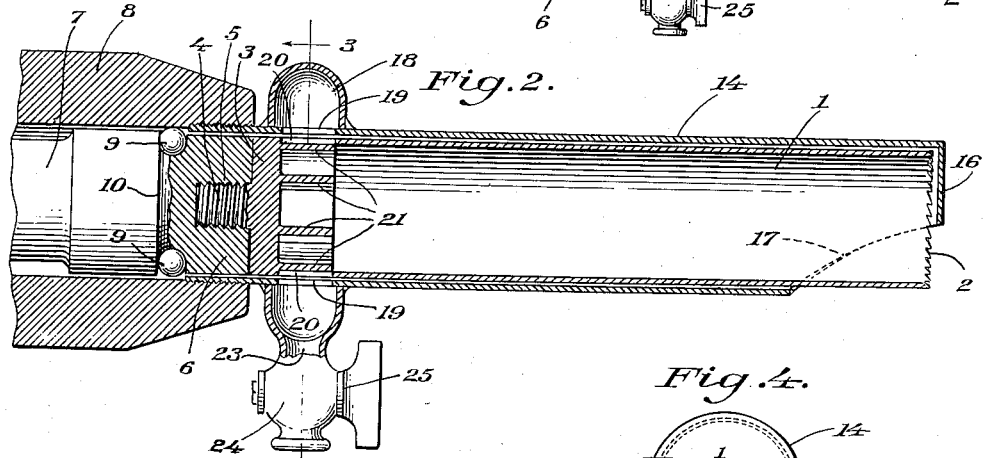
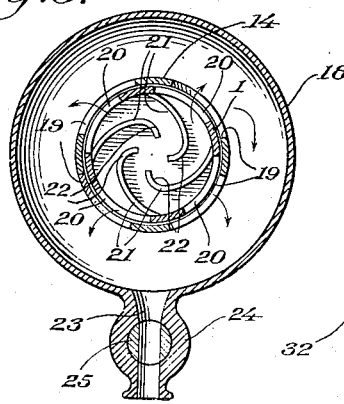
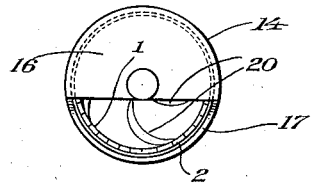
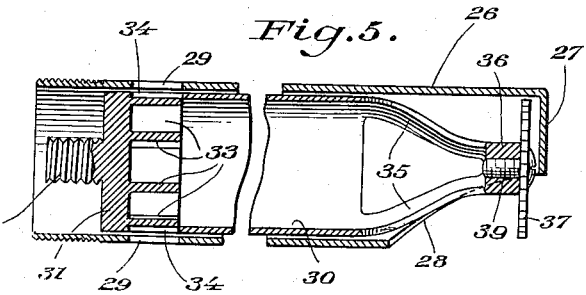
INVENTOR.
Samuel B. Smith:
BY
Victor J. Evans & Co.
ATTORNEYS Patented Feb. 20, 1945

2,369,925

UNITED STATES PATENT OFFICE 2,369,925

SURGICAL INSTRUMENT FOR BONE CUTTING

Samuel B. Smith, North Hackensack, N. J.

Application February 24, 1944, Serial No. 523,709

4 Claims. (Cl. 128—317)

This invention relates to surgical instruments and more particularly to a saw for cutting bone, it being one object of the invention to provide a saw having suction means associated with it so that as bone is cut from a nasal passage, or the like, cuttings may be withdrawn by suction and the passage thus kept clear.

Another object of the invention is to provide an instrument of this character wherein the saw is enclosed in a tubular casing and has a suction fan associated with it so that as the bone is cut the cuttings will be drawn rearwardly and discharged from the rear portion of the casing.

Another object of the invention is to provide a saw consisting of a tube having teeth at its front end and blades adjacent its rear end so that the blades are carried by and turn with the saw.

Another object of the invention is to provide a saw having a handle through which the shank of the tubular cutter is rotatably mounted and has its rear end connected with a rotary drive shaft, bearings being provided for the shank of the cutter so that the handle may be held and the cutter turn freely.

Another object of the invention is to provide a suction-cleaned rotary saw which is simple i construction, cheap to manufacture, and not liable to get out of order.

The invention is illustrated in the accompanying drawing wherein:

Figure 1 is a view showing the improved saw in side elevation with a portion of the handle in longitudinal section.

Figure 2 is a sectional view upon an enlarged scale taken longitudinally through the saw.

Figure 3 is a transverse sectional view taken along line 3—3 of Figure 2.

Figure 4 is a view looking at the front end of the cutter and its shield or casing.

Figure 5 is a sectional view of a modified form of instrument.

This improved instrument is a saw and is primarily intended for use in order to remove obstructions from a nasal passage but it is to be understood that its use is not limited to this as it may be used for cutting through bone and other obstructions in various places.

The cutter 1 of this saw consists of a cylinder formed of steel and having teeth 2 about its open front end. This cylinder may be of any length and diameter desired, according to the use to which the instrument is to be put, and has its rear end closed by a head 3 from which extends a centrally located threaded stem or shank 4 adapted to be screwed into a socket 5 formed in the head 6 of a shaft or rotary carrier 7. This shaft or carrier extends longitudinally through a handle 8 in which it is rotatably mounted by bearings at its front and rear ends. The bearing for the front end of the shaft has been shown as balls 9 mounted in a groove 10 formed about the head 6 midway the length thereof and the rear bearing may be of similar formation or any other conventional construction. At its rear end the handle carries a head or disk 11 carrying a coupling 12 by means of which a flexible shaft 13 is held in engagement with the rear end of shaft 7 so that rotary motion may be transmitted from a source of power to shaft 7. Since the cutter is in threaded engagement with the front end of the shaft 7 it may be removed and another cutter substituted when so desired.

The cutter is housed in a tubular casing 14 formed of metal or other suitable material and this casing or housing has its open rear end externally threaded, as shown at 15, and screwed into the front end of the handle 8. The front end of the casing has a head 16 which is partially cut away, together with a side portion of the front end of the casing, to form a side opening 17 which tapers towards its rear and through which a segment of the front end of the cutter is exposed so that its teeth may have cutting engagement with material to be removed when the instrument is in use. Since the casing is screwed into the front end of the handle it may be turned with the handle to expose portions of the toothed cutting end of the cutter and since only a portion of the toothed end of the cutter will be exposed, the device may be thrust into a nasal passage and an obstruction at a side thereof cut away without danger of the cylindrical saw cutting other portions of the wall of the passage.

During use of the instrument it is desired to remove cuttings and also material cut away by the cutter. In order to do so there has been provided a circular pump housing 18 which is mounted about the casing 14 near the rear end thereof. Openings 19 establish communication between the fan housing and the interior of the casing 14 and the portion of the cutter about which openings 19 extend is formed with openings 20 surrounding blades 21 which are carried by the head 3 and spaced from each other circumferentially thereof. The blades extend diagonally of the head and are curved longitudinally with their outer ends abutting the wall of the cutter between the openings 20 and their inner end portions terminating in abruptly curved ends located near the center of the head 3. The blades move with the cutter and create suction rearwardly through the cutter and from an inspection of Figure 2 it will be seen that during use of the instrument cuttings will be drawn rearwardly through the cutter and discharged into the fan casing 18 from which they pass through the port 23 of the discharge nozzle 24. By turning the valve plug 25 of the nozzle the suction may be controlled and damage to membranes of the nose due to too strong a suction avoided. This also allows cuttings and removed obstructions to be confined in the housing 18 instead of being blown out through the discharge port during use of the instrument. After the operation has been performed the casing 14 and the tubular saw may be removed for thorough cleaning and sterilizing and then reassembled.

In Figure 5 there has been illustrated an instrument of modified construction. In this embodiment of the invention the casing 26 has a head 27 at its front end and a rearwardly tapered side opening 28 corresponding to opening 17, the rear end of the casing being externally threaded so that it may be mounted in a handle. There have also been provided discharge openings 29 corresponding to the openings 19 which may be enclosed in a fan housing corresponding to the housing 18 or such housing omitted. The sleeve or tube 30 which fits within the casing 26 has a head 31 at its rear end carrying a threaded stem 32 and blades 33 and the wall of the tube is formed with openings 34 for registering with openings 29 so that air and cuttings may escape from the tube. The forward portion of the tube is formed with arms 35 which are spaced from each other circumferentially of the tube and converge forwardly with their front ends carrying a block 36 to which a cutter 37 is secured by a screw 38. This cutter may be a circular knife, saw, or the like and when the instrument is in use cuttings will be sucked into the tube and rearwardly through the tube and discharged through the openings 34 and 29.

By removing the casing or shield 14, and leaving the tubular saw 1 attached to the head 6 of the shaft 7, the instrument may be used for the purpose of fitting around a bullet embedded in a bone and thus enable the bullet to be easily removed, as will be understood.

Having thus described the invention, what is claimed is:

1. An instrument of the character described comprising a handle, a shaft extending longitudinally through said handle and rotatably mounted therein, said shaft having a head at its front end formed with a threaded socket, a cylindrical casing having its rear end portion externally threaded and screwed into the front end of said handle about the head of said shaft, a head at the front end of said casing partially cut off together with a side portion of the casing and forming a rearwardly tapered side opening at the front end of the casing, a tubular cutter in said casing having its front end exposed through the side opening of the casing and formed with teeth about its front end, a head at the rear end of said cutter carrying a threaded stem, said stem being screwed into said socket and detachably connecting the cutter with said shaft, said casing and said cutter having their rear portions formed with side openings, blades carried by the head of said cutter and projecting forwardly therefrom in circumferentially spaced relation to each other, the blades being diagonally disposed and curved longitudinally and having abruptly curved inner ends adjacent the center of the head, a housing surrounding the rear portion of said casing in enclosing relation to openings in the casing, and a discharge nozzle for said housing having a port and a plug for controlling flow through the port.

2. An instrument of the character described comprising a handle, a shaft rotatably mounted in said handle, a tubular casing extending forwardly from said handle and having its rear end portion detachably engaged with the handle, said casing having a head at its front end partially cut off together with a side portion of the casing to form a side opening at the front of the casing, a tubular cutter in said casing having a head at its rear end detachably connected with the front end of said shaft, said cutter having its front end sharpened and partially exposed through the side opening of the casing, blades for creating suction rearwardly through said cutter extending forwardly from the head of said cutter and disposed diagonally thereof with their inner ends curved towards the center of the head, said casing being formed with circumferentially spaced openings about the blades, the tubular cutter being formed with circumferentially spaced openings for registering with openings of the casing during rotation of the cutter, and a housing surrounding said casing in enclosing relation to the openings therein and provided with an outlet.

3. An instrument of the character described comprising a handle, a shaft rotatably mounted in said handle, a cylindrical casing extending forwardly from said handle and having an opening at its front end, a tubular cutter in said casing having a head at its rear end connected with said shaft and its front end sharpened and exposed through the side opening at the front of the casing, a circular housing extending about said casing in advance of the head of said cutter and having an outlet, the casing being formed with openings within the housing and the cutter being formed with opening for registering with the openings of the casing, and blades carried by the head of the cutter for drawing air rearwardly through the cutter and forcing the air outwardly through openings of the cutter and the casing into said housing during rotation of the cutter.

4. An instrument of the character described comprising a handle, a shaft rotatably mounted in said handle, a cylindrical casing projecting forwardly from said handle and having an opening at its front end, a housing about said casing in advance of said handle having an outlet, a tubular cutter in said casing carried by said shaft and having its front end sharpened and exposed through the opening at the front end of the casing, the cutter and the casing having rear portions formed with openings establishing communication with said housing, and fan blades in said cutter for creating suction rearwardly through the cutter and forcing air and cuttings through said openings into said housing and out through the outlet thereof.

SAMUEL B. SMITH.